(12) United States Patent
Herrmann et al.

(10) Patent No.: US 6,711,403 B1
(45) Date of Patent: Mar. 23, 2004

(54) WIRELESS NETWORK WITH SIGNALING SEQUENCE EXCHANGE BETWEEN A BASE STATION AND A PLURALITY OF TERMINALS

(75) Inventors: Christoph Herrmann, Aachen (DE); Yonggang Du, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/483,922

(22) Filed: Jan. 18, 2000

(30) Foreign Application Priority Data

Jan. 18, 1999 (DE) .......................................... 199 01 622

(51) Int. Cl.[7] .............................................. H04B 15/00
(52) U.S. Cl. ..................... 455/422.1; 455/561; 375/130
(58) Field of Search ................................. 455/450, 451, 455/452, 455, 464, 504, 516, 511, 515, 517, 422, 524, 561; 370/230, 329, 508, 519, 537, 345; 375/142, 130, 144, 148

(56) References Cited

U.S. PATENT DOCUMENTS

| | | | | |
|---|---|---|---|---|
| 5,548,834 A | * | 8/1996 | Suard et al. ................. 455/137 |
| 5,663,958 A | * | 9/1997 | Ward ........................... 370/347 |
| 5,790,551 A | * | 8/1998 | Chan ........................... 370/348 |
| 5,978,367 A | * | 11/1999 | Kinnunen et al. ........... 370/337 |
| 6,031,827 A | * | 2/2000 | Rikkinen et al. ............ 370/330 |
| 6,091,757 A | * | 7/2000 | Cudak et al. ................ 370/508 |
| 6,289,003 B1 | * | 9/2001 | Raitola et al. ............... 370/277 |
| 6,389,056 B1 | * | 5/2002 | Kanterakis et al. ......... 370/342 |
| 2002/0002050 A1 | * | 1/2002 | Rinne et al. ................. 455/434 |

OTHER PUBLICATIONS

ETSI SMG2, Meeting No. 24, Cork, Ireland, Dec. 1–5, 1997, Tdoc smg2 359/97, Concept Group Alpha—Wideband Direct Sequence CDMA (WCDMA) Evaluation Document (3.0) part 1; System Description, Performance Evaluation.

* cited by examiner

Primary Examiner—Pablo N. Tran (57) ABSTRACT

The present invention relates to a wireless network having at least a base station and a plurality of assigned terminals for exchanging user data and control data, wherein the base station is provided for transmitting the start time of at least one signaling sequence of at least one terminal and includes a device for correlating a received signaling sequence and for detecting the pulse evolved from a received and correlated signaling sequence, and wherein the base station, after receiving a signaling sequence, is provided for rejecting or acknowledging the request for channel capacity from a terminal over a channel collectively used by a plurality of terminals.

4 Claims, 4 Drawing Sheets

WIRELESS NETWORK WITH SIGNALING SEQUENCE EXCHANGE BETWEEN A BASE STATION AND A PLURALITY OF TERMINALS

FIELD OF THE INVENTION

The invention relates to a wireless network comprising at least a base station and a plurality of assigned terminals for exchanging user data and control data.

BACKGROUND OF THE INVENTION

In the document "ETSI SMG2, Meeting no. 24, Cork, Ireland, Dec. 1–5 1997, Tdoc SMG2 359/97, Concept Group Alpha—Wideband Direct-Sequence CDMA (WCDMA), EVALUATION DOCUMENT (3.0), part 1: System Description, Performance Evaluation" a radio network operating according to the CDMA method (CDMA=code-division multiple access) is proposed. The radio network comprises a plurality of radio cells having each a base station and terminals or mobile stations located therein. After a terminal has been registered and synchronized, it sends a random-access burst over a random-access channel RACH, for example, when a user channel is requested. The random-access burst comprises a preamble part and a data part. The preamble part comprises 16 orthogonal symbols (preamble sequence) which is spread by a Gold code (preamble code). The Gold code contains 256 chip intervals. The data part contains a field with an identification for the terminal, a field for featuring the requested service (short packet transmission, dedicated-channel set-up, etc.), an optional field for data packets (optional user packet) and a CRC field for error detection. A random-access burst received from a base station is supplied via a matched filter, a preamble correlator, a peak detector to a circuit portion estimating the time delay of the data part, which circuit portion controls a rake circuit for the evaluation of the data part. Thus, a peak detection based on a correlation is used here with subsequent message decoding. To the terminals assigned to a base station there are 80 random-access channels available. These channels are determined by 16 different preamble codes and 5 different transmission instants. If two or more terminals transmit over the same random-access channel i.e. the same preamble code and transmit time is selected, there will be a collision and the information transmitted by the terminals cannot be correctly evaluated by the base station. Such collisions are especially probable with heavy traffic loads.

BRIEF SUMMARY OF THE INVENTION

It is an object of the invention to provide a wireless network in which a terminal exchanges signaling information with the assigned base station in a different manner.

With a wireless network of the type defined in the opening paragraph, the object is achieved in that the base station is provided for transmitting the start time of at least one signaling sequence of at least one terminal, in that the base station includes a device for correlating a received signaling sequence and for detecting the pulse evolved from a received and correlated signaling sequence and in that the base station, after receiving a signaling sequence, is provided for rejecting or acknowledging the request for channel capacity from a terminal over a channel collectively used by a plurality of terminals.

The wireless network according to the invention is understood to mean a network comprising a plurality of radio cells in which a respective base station and a plurality of terminals transmit control data and user data in a wireless fashion. A wireless transmission is used for transmitting information, for example, by radio, ultrasonic or infrared channels.

After the registration and synchronization, a terminal is to request a certain user channel from the assigned base station for transmitting user data. Such a user channel may be, for example, a dedicated user channel (for example, for speech transmission) either between base station and terminal or between two terminals. The channel assignment is carried out by the base station. According to the invention a terminal sends a request, for example, for a dedicated user channel through a signaling channel predefined by the base station. The base station is to announce to the terminals at least the start time of a signaling sequence that may be known beforehand. Alternatively, it is possible that, in addition to the start time also one of various signaling sequences is assigned to the terminals. Such a signaling sequence is a Gold or a Casami sequence having good auto and cross-correlation properties. The base station includes a device (for example, a matched filter) in which a correlation is effected of the received signaling sequences. The pulse evolved from the correlation is detected and assigned to a terminal. Since a collision in the network according to the invention is avoided as a result of different start times of the signaling sequences, and no message decoding is executed after a peak detection based on a correlation, but the appearance of the pulse evolved from the signaling sequence is considered a signaling request, a signaling detection especially with heavy traffic loads can be executed in a more robust and faster way than in the state of the art.

For detecting a signaling sequence, a certain time range is selected for the peak detection, which range depends on the start time of the signaling sequence and on the channel properties. Such a time range is denoted as a detection window. The length or duration and the start time of the detection window is to be selected such that a peak detection is possible. The detection windows are shorter than the time duration of the random-access bursts known from the state of the art. By means of the signaling according to the invention, many terminals can thus send a signaling request within a short period of time.

After the registration and synchronization, a terminal in a radio cell has always the same start time relative to a reference frame for transmitting a signaling sequence, as long as the base station does not explicitly change this start time. Thus one signaling channel is permanently occupied for one terminal. Since many start times may occur within the reference frame which is of short duration (for example, 10 ms) and since all the terminals of a radio cell use the same signaling sequence, only few network resources are used when a terminal is permanently assigned a start time and a signaling sequence.

The signaling sequences of all the terminals in a radio cell have different start times. In the simplest case, each terminal uses the same signaling sequences. The signaling sequences may therefore partly overlap, because the length of a sequence is usually longer than the distance between two successive start times.

An advantage of the network according to the invention also comprises the certainty with which a signaling request is recognized. Practically always after the transmission of a signaling sequence, a detectable pulse is generated. This is caused by the fact that interference signals and channel noise may lead to "artificial" pulses on the output of the matched filter. It is highly unlikely for these artificial pulses to reduce the amplitude of the pulses on the output of the matched filter when an actually transmitted signaling sequence has been received. In the worst case (for example, in the event of interference) a false alarm is made when the amplitude of the interference or noise signal surpasses the detection threshold without a signaling sequence having been sent.

The signaling sequence may also be used for requesting channel capacity of a shared uplink channel. The base station, after receiving a signaling sequence, either rejects the request or acknowledges the request for channel capacity from the terminal over a channel which is shared by a plurality of terminals. The use of a shared channel provides a capacity increase because of static effects.

The acknowledgement or rejection of the channel capacity for at least one terminal is sent by the base station to the respective terminal via an access control channel. By means of the acknowledgement, the base station sends further information which relates to the transmission of user data over the shared channel. Such information may relate to the start time of the transmission of the user data, data rate, the transmission power, the spreading factor and so on.

The shared channel may be used by, for example, 8 terminals for transmitting user data. If a further terminal wishes to use this channel, this terminal will transmit a further specific signaling sequence. The base station tests whether the terminal can be included in the group of various of terminals using the shared channel. If the result of the test is positive, the base station announces to the respective terminal that it is included in the group.

These and other aspects of the invention are apparent from and will be elucidated with reference to the embodiments described hereinafter.

DETAILED DESCRIPTION

Figure 1:
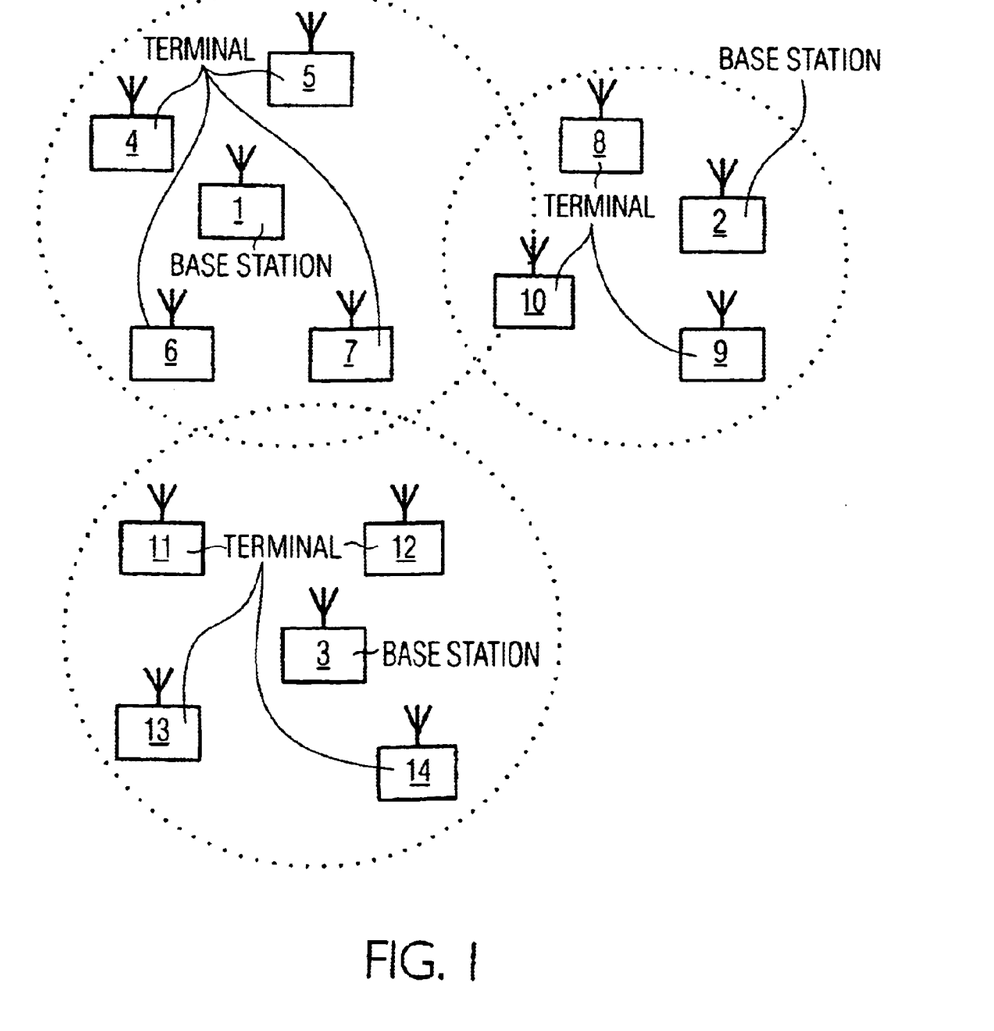
FIG. 1 shows a wireless network comprising a plurality of base stations and terminals.

FIG. 1 shows a wireless network, for example, a radio network, comprising a plurality of base stations 1 to 3 and a plurality of terminals 4 to 14. Certain terminals 4 to 14 are assigned to a base station 1 to 3. In the example shown in FIG. 1, the base station 1 is assigned the terminals 4 to 7, the base station 2 the terminals 8 to 10 and the base station 3 the terminals 11 to 14. An exchange of control data takes place at least between the base station and the terminals. An exchange of user data can take place between the base station and the terminals as well as between the terminals. In both cases the link for the transmission of user data is set up by the base station. The terminals 4 to 14 are usually mobile stations which are controlled by a stationary base station 1 to 3. However, a base station 1 to 3 may also be mobile as required.

In the wireless network are transmitted, for example, radio signals according to the FDMA, TDMA or CDMA method (FDMA=Frequency-Division Multiple Access, TDMA=Time-Division Multiple Access, CDMA=Code-Division Multiple Access),or in conformity with a combination of the methods.

According to the CDMA method, which is a special code spreading method, binary information (data signal) originating from a user is modulated with a different code sequence. Such a code sequence comprises a pseudo-random square-wave signal (pseudo-noise code) whose rate, also referred to as chip rate, is generally considerably higher than that of the binary information. The duration of a square-wave pulse of the pseudo-random square-wave signal is referred to as chip interval $T_C$. $1/T_C$ is the chip rate. The multiplication or modulation respectively of the data signal by the pseudo-random square-wave signal results in a spreading of the spectrum by the spreading factor $N_C=T/T_C$, where T is the duration of a square-wave pulse of the data signal.

To the base stations are assigned certain radio cells in which the data traffic takes place with the respective terminals located in the radio cells. When a terminal moves from one radio cell to another radio cell, the assignment of the terminal is transferred from the one base station to the other in conformity with given specifications. Such a terminal can then simultaneously exchange data with the base stations of the two radio cells when it changes over from one radio cell to the other. This is referred to as a soft hand-over. A radio cell is shown in FIG. 1 by a dotted circle in FIG. 1.

User data and control data are transmitted between at least one terminal and a base station over channels predefined by the base station. The radio link from the base station to the terminals is referred to as a down link and that from the terminals to the base station as an uplink. In this way data are transmitted from the base station to the terminals over down link channels and from terminals to the base station over uplink channels. For example, a down link control channel may be provided which is used for broadcasting control data from the base station to all the terminals prior to a connection set up. Such a channel is referred to as a down link broadcast control channel. For transmitting control data from a terminal to the base station prior to a connection set-up, for example, an uplink control channel assigned by the base station can be used which, however, can also be accessed by other terminals. An uplink channel that can be used by a plurality of or all the terminals is referred to as a shared uplink channel. After a connection set-up, for example, between a terminal and the base station, user data are transmitted over a down link and an uplink user channel. For the direct transmission of user data between two terminals, channels are used which are referred to as peer-to-peer user channels. Channels that are set up only between one transmitter and one receiver are referred to as dedicated channels. As a rule, a user channel is a dedicated channel that can be accompanied by a dedicated control channel for transmitting link-specific control data.

A channel is determined by a frequency range, a time range and, for example, in the case of the CDMA method, by a spreading code. For user data to be exchanged between the base station and a terminal, it is necessary for the terminal to be synchronized with the base station. For example, it is known from the GSM system (GSM=Global System for Mobile communications), in which a combination of FDMA and TDMA methods is used, that the time-dependent position of a frame is determined (frame synchronization) on the basis of predefined parameters after a suitable frequency range has been determined, which frame synchronization helps in sequencing the data transmission. Such a frame is always necessary for the data synchronization of terminals and base station in the case of TDMA, FDMA and CDMA methods. Such a frame may include various sub-frames or form a superframe together with several, other successive frames. For simplicity, a frame is started from which is referred to as a reference frame.

For carrying out a frame synchronization, all the terminals must be synchronized with a base station by means of pulses transmitted by the base station. When no code spreading method (for example, CDMA method) is used (for example, a TDMA method is used), the pulse duration corresponds exactly with the time interval necessary for transmitting one bit. When a code spreading method is used indeed, the pulse duration corresponds with one chip interval. A bit interval then corresponds with a plurality of chip intervals. For frame synchronization it is necessary that a special pulse sequence is transmitted by the base station. The start time of the pulse sequence corresponds to the start time of a frame.

In the following it will be assumed that the terminals have already been synchronized with the base station and registered there. Before a terminal (for example, one of the terminals 4 to 7 in FIG. 1) can transmit and receive user data, it must be assigned a user channel by the associated base station (for example, base station 1 in FIG. 1) for a down link and an uplink connection or a peer-to-peer user channel. For this purpose, the base station (for example, the base station 1 in FIG. 1) sends to the assigned terminals (for example, the terminals 4 to 7) control data via a downlink broadcast control channel during a frame that can be selected at random. These control data inform the terminals of the instant (sequence start time) relative to the frame, at which these terminals can transmit a special signaling sequence. Such a signaling sequence transmitted by a terminal is a pseudo-random square-wave signal and indicates that the relevant terminal requests a user channel. Therefore, for the transmission of a signaling sequence, the base station assigns to each terminal an uplink signaling channel over which signaling sequences are transmitted. To limit the number of transmissions of control data, the base station can assign the signaling sequence and the sequence start time for each terminal only once. This may be effected, for example, during the registration of a terminal at the assigned base station. However, the assignment of the sequence start times may also be effected—as will be explained below—in dependence on the different channel properties of the links between base station and terminals. A signaling channel in this invention is realized by the specific signaling sequence and its start time.

All the terminals assigned to a base station transmit the same signaling sequence, but at different times (sequence start times). Consequently, different base stations assign different signaling sequences to their assigned registered terminals. It is then sufficient, however, when only the neighboring base stations have respective, different signaling sequences. When a terminal, for example, when moving from one radio cell to another, is registered with two base stations, the terminal transmits the signaling sequence which predefines the base station from which a user channel is requested.

A base station includes a single matched filter and a peak detector connected downstream in the circuit for detecting the signaling sequences transmitted by the terminals. The matched filter is clocked at a clock rate that is at least equal to the maximum chip rate when code spreading is used, or equal to the maximum bit rate when code spreading is not used. The terminals transmit the signaling sequences that have a good autocorrelation property. This means that pulses that occur on the output of the matched filter and stem from successive signaling sequences from different terminals, can be detected unambiguously by the peak detector within a detection window. The choice of the clock rate in dependence on the maximum chip rate or bit rate respectively, and a signaling sequence with suitable autocorrelation properties enables the successive signaling sequences to have a minimum distance in time between the start times. Furthermore, the signaling sequence is to have a good cross-correlation property i.e. the correlation with other signals to be transmitted in the network is to be small. Thus, on the one hand, the other signals transmitted within the network and received by the matched filter are interpreted by the peak detector as a negligibly small noise signal whereas, on the other hand, the signaling sequences are interpreted as a negligibly small noise or interference signal by other circuit elements in the base station which process the other signals transmitted within the network. A signaling sequence of this kind, having good auto and cross-correlation properties is, for example, the sequence from the book "J. G. Proakis: Digital Communications by J. G. Proakis, third edition, McGraw-Hill International Editions, 1995, pp. 724 to 729" known as Gold and Kasami sequence.

The pulses produced on the output of the matched filter are a measure for the energy of the signaling sequences. The length and the amplitude of the signaling sequence which are low in contradistinction to those of the other signals to be transmitted, consequently determine the pulse height on the output of the matched filter.

The sequence start time of a signaling sequence is to be defined by the base station, so that the matched filter in the base station generates a pulse after detection of a signaling sequence from a terminal assigned thereto in a predefined detection window. This detection window has the duration or length $\delta$.

Figure 2:
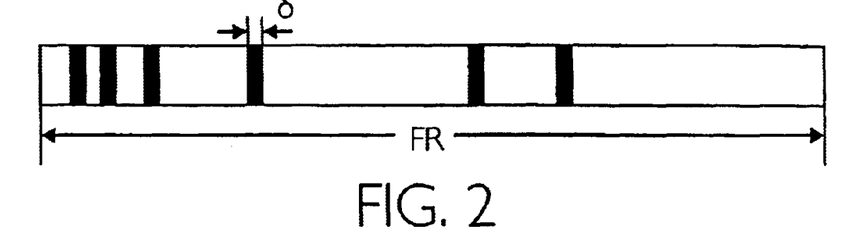
FIGS. 2 and 3 show sequences of detection windows for a matched filter used in a base station in relation to a reference window.

In principle, the signaling sequences can be transmitted at arbitrary sequence start times. A sequence start time is linked with the appearance of a pulse on the output of the matched filter. The detection commences after a signaling sequence has been transmitted and after a delay caused by the channel property of a link between at least one terminal and a base station. A channel property is to be understood to mean the physical parameters of a channel. A channel property is, for example, the distance between a terminal and a base station. In consequence, it is possible for the peak detector to utilize detection windows of different widths for the various terminals. For simplicity, however, a uniform width of the detection window is chosen herein. The sequence of randomly occurring detection windows having duration $\delta$ is shown in FIG. 2 in relation to the reference frame having length FR. From a received signaling sequence the matched filter generally produces a pulse sequence having a main pulse and several subsidiary pulses usually symmetrically distributed around the main pulse. The amplitude of the subsidiary pulses is regularly smaller than the amplitude of the main pulse.

The various main pulses generated by the matched filter have to have an adequate guard time in order to ensure that the pulse sequences from the various terminals, appearing on the output of the matched filter and distorted by the channel, do not overlap so that unambiguous detection is impossible. In the case of a certain overlap, the base station cannot unambiguously assign the pulses to a terminal. The width or duration δ of the detection window must therefore be at least equal to the main pulse as it occurs without being influenced by the channel, plus an additional channel-dependent guard interval. This also provides results the distance between successive, equal signaling sequences. However, the time distances between two different signaling sequences originating from different base stations need not be taken into account, because the weak correlation ensures that a peak detector connected downstream of the matched filter detects a signaling sequence from another base station or radio area as non-disturbing noise.

Figure 3:
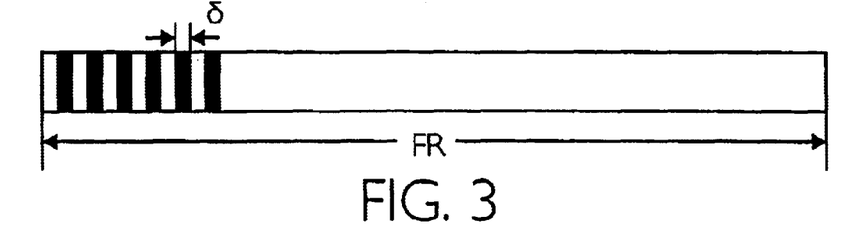

In order to transmit as many signaling sequences as possible within a predetermined time range, an optimized spacing of the sequence start times can be provided according to the invention. This means that each time the width of the detection window is always determined in dependence on the channel properties between a terminal and the base station. Another possibility according to the invention which can be realized in a simpler manner is that the signaling sequences are successively transmitted a constant distance part. When the constant distance is determined, the poorest channel properties are to be taken into account. FIG. 3 shows the continuously successive detection windows in relation to the reference frame having length FR, occurring as a result of the signaling sequences transmitted with a constant predefined spacing.

Figure 4:
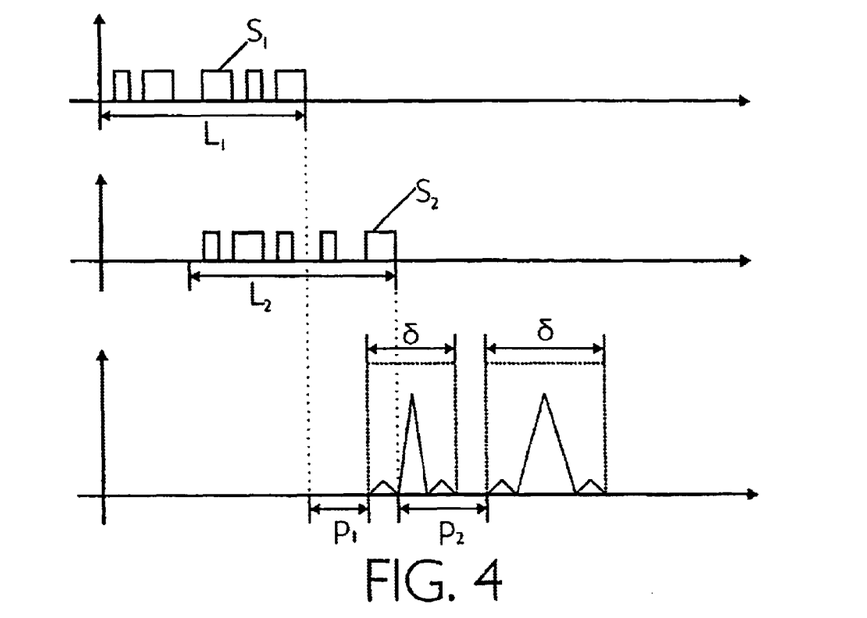
FIG. 4 shows by way of example two signaling sequences transmitted by two terminals and the respective detection windows.

FIG. 4 shows two signaling sequences $S_1$ and $S_2$ by way of example, which have the sequence duration or sequence length $L_1$ and $L_2$, respectively. After a delay $p_1$ and $p_2$ imposed by the channel properties, the detection operation or the detection window having length δ commences. A main pulse and subsidiary pulses associated with a signaling sequence occur in such a detection window.

The length δ of the detection window is determined more particularly by three factors (channel properties). Firstly, the accuracy of the estimate of the propagation delay of the data to be transmitted from the terminals to the base station is to be taken into account, secondly the delay spread characteristic based on multipath propagation, and thirdly the autocorrelation properties of the signaling sequences of the terminals.

In a radio cell the terminals are usually located at different distances from the base station. This leads to different propagation delays of the signaling sequences transmitted by the terminals. The propagation delay between the terminal $MT_i$ and the base station B should be equal to $p_i$ and the length of the signaling sequence should be equal to L. When the base station expects a pulse for the terminal $MT_i$ at the output of the matched filter at the instant $t_i$, it instructs the terminal $MT_i$ to start the transmission of the signaling sequence at the instant $t_i$-$p_i$-L. However, because of the limited accuracy of the estimate of the propagation delay $p_i$, the pulse at the output of the matched filter is inherently inaccurate. This inaccuracy of the estimate of the propagation delay $p_i$ must be compensated by a sufficiently long detection window δ. When the maximum inaccuracy of the estimate amounts to j for all the terminals, the detection window must be larger than j.

The data between a terminal and a base station are usually not transmitted via only one radio link, but via several links (multipath propagation). Because of reflection and deflection effects, the signals transmitted from a terminal to the base station travel along different paths and the signals resulting therefrom and traveling along different paths are received by the base station at different instants. Consequently, at the output of the matched filter not only a single main pulse appears for a signaling sequence, but also further main pulses. These further main pulses evolve at the output of the matched filter because of signals produced by the multipath propagation and grouped around the actual main pulse. The actual main pulse arises at the output of the matched filter from the actual received signaling sequence. Therefore, the length δ of the detection window must be larger than a window of length w which contains the actual main pulse and the further main pulses. It is to be noted that even in the absence of multipath propagation, not only an actual main pulse occurs at the output of the matched filter, but also subsidiary pulses. However, because of the described suitable autocorrelation properties, the amplitude of the subsidiary pulses is much lower than the amplitude of the main pulse.

The autocorrelation property of the signaling sequence is the measure for the width of the main pulse and the minimums and maximums of the subsidiary pulses at the output of the matched filter (without taking the channel properties into account). In the case of a Gold or Kasami sequence, the main pulse at the output of the matched filter is approximately equal to the energy of the signaling sequence, as stated above. The amplitude of the main pulse is then much higher than that of the subsidiary pulses. The energy of the signaling sequence is thus determined by its amplitude and duration or length. In order to reduce the interference with other signals, the amplitude of the signaling sequence (for example, a Gold or Kasami sequence) must be significantly smaller than that of the other signals. However, in order to enable detection of a signaling sequence by means of the matched filter, the signaling sequence must be sufficiently long. The duration of the detection of a signaling sequence is thus prolonged and so is the assignment by the base station of the user channels to the terminal that has transmitted a signaling sequence (prolongation of the signaling time). The length of a signaling sequence thus influences the autocorrelation property of the signaling sequence as well as the signaling time. When the autocorrelation function for a given signaling sequence is sufficiently large within a time interval q, δ must be larger than q.

It is to be noted that the length or duration δ of the detection window must be chosen to be equal to the sum of the values of j, w and q:

$$\delta = j + w + q.$$

Thus far, a description has been given of the case where the duration δ of the detection window is proportioned, so that only a single signaling sequence can be detected. This means that a base station receives a binary information signal or 1-bit information signal. This binary information signal indicates whether a terminal, having transmitted the signaling sequence, requests a new user channel (pulse present at the output of the matched filter for the duration of the detection window) or no user channel (pulse absent at the output of the matched filter for the duration of the detection window). Hereinafter the extension of the transmission from a 1-bit to an n-bit information signal (n exceeds 1 and is an integer) will be described. A terminal then transmits the same signaling sequence not once but several times in succession within each reference frame in order to make an n-bit information signal available to the base station. This extension from 1-bit to n-bit information is achieved by prolongation of the detection window in that the duration or length of the detection window is increased by the factor n for each terminal concerned. During the occurrence of the detection window that is enlarged n times, n signaling sequences from a terminal can thus be detected. The terminal transmitting an n-bit information signal (signaling data) utilizes the same signaling sequences whose starting instants have been shifted each time by the value δ. A transmitted signaling sequence then indicates, for example, a "1" and a non-transmitted signaling sequence indicates a "0".

Figure 5:
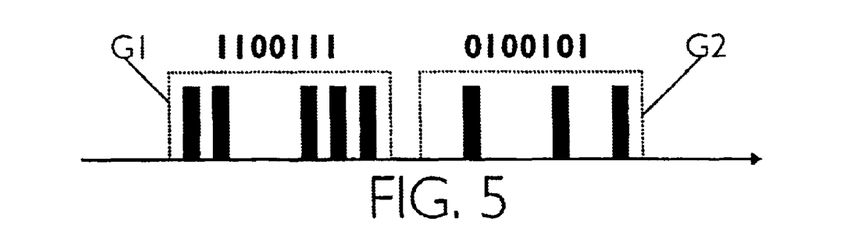
FIG. 5 shows the position of the pulses formed from the detection of signaling sequences for transmitting n-bit signaling information.

FIG. 5 shows an example of the position of pulses detected from identical signaling sequences. The first group G1 of pulses is associated with signaling sequences of a first terminal and the second group G2 of pulses is associated with signaling sequences of a second terminal. The 7-bit information "1100111" results from the group G1 and the information "0100101" from the second group G2.

The transmission of n-bit information by a terminal enables various signaling applications. For example, the information "000", corresponding to non-transmission of three successive signaling sequences, may mean that the terminal does not request a user channel. The information "001" may mean that the terminal requests an 8-kbit/s user channel. Two non-transmitted signaling sequences and one transmitted signaling sequence produce the information "001". A terminal can express the request for a 64-kbit/s user channel by way of the information "010" and the request for a 144-kbit/s user channel by way of the information "011".

The matched filter in the base station is then arranged for the reception of 1-bit as well as n-bit information, because the same signaling sequence is received in both cases. In these two cases the only difference resides in the post-processing of the pulses detected by the matched filter. In the former case information processing takes place after the period δ for the detection of one signaling sequence and in the second case after the period nδ for the detection of n signaling sequences.

A further aspect of the invention concerns the increase of the number of signaling channels. The number of signaling channels of a base station is limited to the value FR/δ when a single signaling sequence is used; therein, FR denotes the length of the reference frame and δ the length of a detection window. In this respect it is assumed that only 1-bit information is transmitted and that each detection window has the same length δ. Should a base station wish to assign more signaling channels than given by the value FR/δ, it can assign different signaling sequences instead of only a single signaling sequence to the terminals. For example, during one reference frame 100 identical signaling sequences can be detected by the matched filter. However, if 120 terminals wishing to transmit a signaling sequence are present in the radio cell, it is impossible to use the same signaling sequence for all of said 120 terminals. Therefore, for example 60 terminals can transmit a first signaling sequence and the other 60 terminals a second signaling sequence; these sequences can then be detected by two different matched filters in the base station. It is also to be noted that the sequence start times of the different signaling sequences are independent of one another, so that they need not be co-ordinated. It is only necessary to tune the start times of the same signaling sequences to one another.

The invention can be implemented as an additional circuit part in each existing mobile radio system such as, for example, GSM system or a UMTS mobile radio system (UMTS=Universal Mobile Telecommunication System) based on WB-CDMA or CD/TDMA, respectively, FIGS. 6 to 9 show a receiver (FIG. 6) and a transmitter (FIG. 7) of a base station and a receiver (FIG. 8) and a transmitter (FIG. 9) of a terminal.

Figure 6:
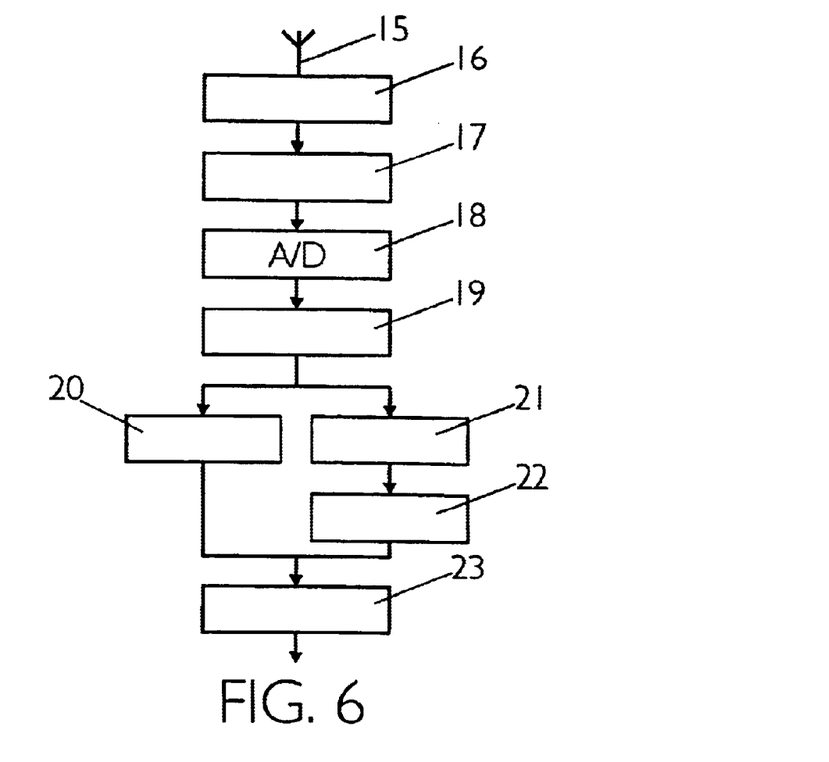
FIG. 6 shows a receiver of a base station.

The block diagram of a receiver of a base station shown in FIG. 6 has as known elements (for example, from the GSM mobile radio system or a CDMA system) an antenna 15, a high-frequency block 16, an intermediate-frequency block 17, an analog/digital converter 18, a demodulator 19 and a block 20 which executes, for example, the switching functions of channel demultiplexing, de-interleaving, channel decoding and, when a CDMA system is used, also de-spreading. The control and user signals occurring in the baseband and applied to a channel access control block 23 which transfers the various signals to the respective units for further processing, for example, to a switching center. According to the invention, the receiver of the base station includes a matched filter 21 which checks the received signals to find whether there is a signaling sequence. If a signaling sequence has been detected during the expected period of time (detection window), that is, at least one pulse is generated, this is detected by a next peak detector 22 and announced to the channel access control block 23 which may be, for example, a processor. The channel access control block 23 leads this message to further control elements downstream in the circuit and not represented here, which then, for example, by means of generated control data, assign a user channel to the terminal via the transmitter of the base station.

The duration or length δ of the detection window may be fixedly predefined and may have been determined, for example, by measurements prior to the normal operation of the network. Alternatively, it is possible for the duration δ of the detection window to be individually determined for each terminal during operation. The duration δ of the detection window for a specific signaling sequence and of a terminal is in this case fed to the peak detector by a control element not further shown here after measuring results have been evaluated. In the GSM mobile radio system, for example, the distance between a base station and a terminal is evaluated on the basis of the signals received in the base station from the terminal.

The information of the pulses generated by the matched filter 21 and determined by the peak detector 22 is processed in the channel access control block 23. A specific detection window is assigned to a terminal. If at least one main pulse is detected in such a detection window, the channel access control block 23 establishes that there is a request for a user channel from the terminal. From this request and the requests from further terminals and while considering the existing connections or assigned user channels, a control element not further shown here decides, after receiving the request from the channel access control block 23, whether a user channel can be rendered available to the requesting terminal. If an assignment of a user channel is possible, this user channel is determined and, after processing in a transmitter of the base station (FIG. 7), applied to the terminal via a downlink broadcast control channel.

Figure 7:
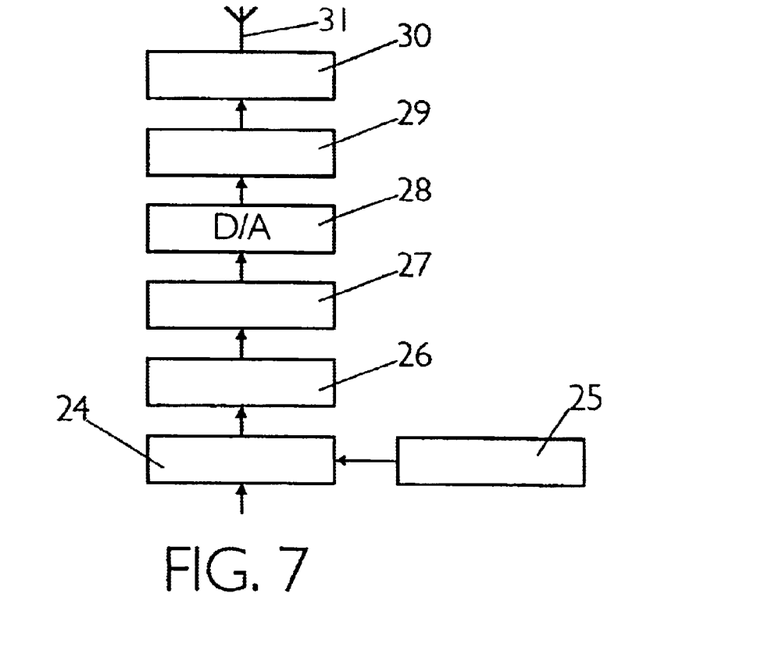
FIG. 7 shows a transmitter of a base station.

The transmitter of the base station represented in FIG. 7 also includes a channel access control block 24 which receives data from various sources 25. Such a source may be, for example, a switching center which produces user data, or a control element which supplies control data. For example, these control data may contain information about a user channel to be used for a terminal, which terminal has previously requested a user channel by means of a signaling sequence. The block 26 following the control block 24 carries out the switching functions of, for example, channel coding, interleaving, channel multiplexing and, when a CDMA system is used, also spreading. The output signal of the block 26 is applied to an antenna 31 via modulator 27, a digital/analog converter 28, an intermediate-frequency block 29 and a high-frequency block 30. All the elements 25 to 31 may be elements known from existing mobile radio systems.

Figure 8:
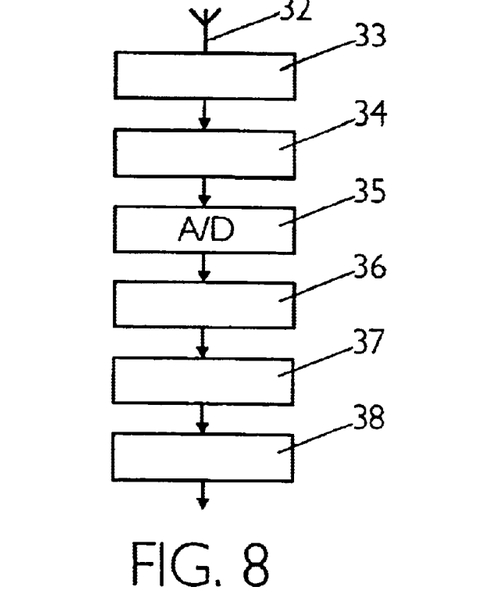
FIG. 8 shows a receiver of a terminal and FIG. 9 shows a transmitter of a terminal.

A block circuit diagram of a receiver of a terminal is shown in FIG. 8. This receiver includes as elements known from, for example, a GSM mobile radio system or a CDMA system, an antenna 32, a high-frequency block 33, an intermediate-frequency block 34, an analog/digital converter 35, a demodulator 36, a block 37 having several functions and a channel access control block 38 which supplies control and user data to various sinks (for example, low-frequency circuit for converting user data into speech data). The block 37 is charged with, for example, the switching functions of channel demultiplexing, de-interleaving, channel decoding and, when a CDMA system is used, de-spreading. The channel access control block 38 evaluates certain channels relevant to the terminal such as, for example, a user channel or a downlink broadcast control channel. This information is transferred to certain other circuit elements in the terminal which are not further shown here. The channel access control block 38 takes from the broadcast control channel the information at which start time at least one signaling sequence can be transmitted. This information is transferred to at least one circuit element not further shown here.

Figure 9:
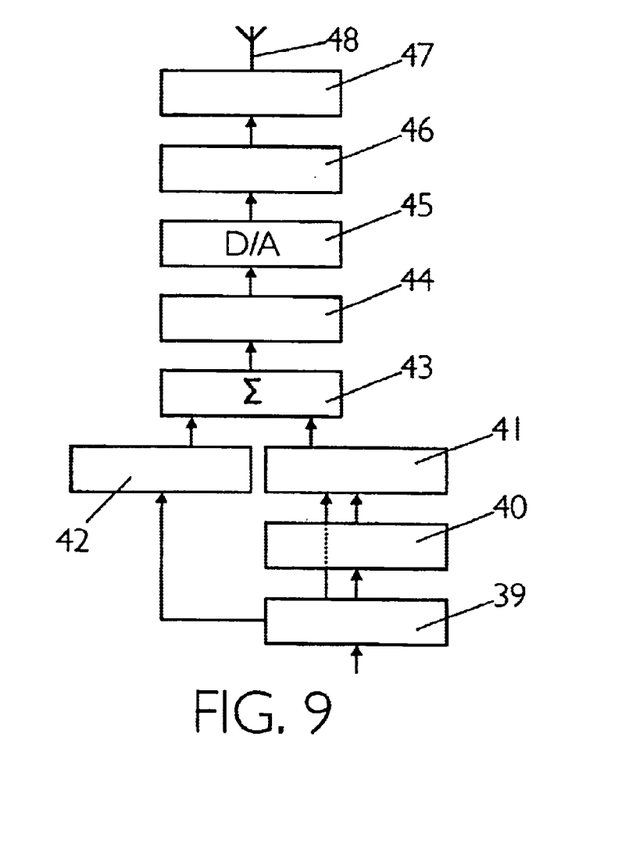

The terminal includes in a transmitter whose associated block circuit diagram is shown in FIG. 9, also a channel access control block 39 which controls the channel access. The channel access control block 39 delivers to a block 42, which executes the switching functions of channel coding, interleaving, channel multiplexing and, when a CDMA system is used, also spreading. Furthermore, the channel access control block 39 indicates to a time controller 40 the start time of a signaling sequence. The user data and control data are received from different sources by the channel access control block 39. Such a source may be, for example, a low-frequency circuit which produces speech data as user data, or a control element which supplies control data. For example, these control data may be information about the start time of a signaling sequence. The time controller 40 delivers time marks to a generator 41 for generating a signaling sequence. The time marks may be, for example, the start and stop times of square-wave pulses of the signaling sequence. The generator includes a memory for storing various signaling sequences. The signaling sequence to be transmitted is selected from the channel access control block. Signaling sequences may be written, as appropriate, in the memory of the generator 41. The generator 41 and the time controller 40 are initialized after the information is received about the signaling sequence to be used and the start time of the signaling sequence. When no change of the signaling sequence and/or start time is indicated by the associated base station, a further initialization of generator 41 and time controller 40 is not necessary.

The user data and control data processed in the block 42 are supplied to a superposition circuit 43 which further receives output signals of the generator 41. The output signal produced by the superposition circuit 43 is transmitted via a modulator 44, to a digital/analog converter 45, to an intermediate-frequency block 46 and to a high-frequency block 47, which radiates by an antenna 48 the signals formed in the high-frequency block.

As observed hereinbefore, a signaling sequence transmitted by a terminal is used for requesting a user channel from the assigned base station. This is usually a dedicated channel. This request is made after a terminal has been synchronized and registered with the base station.

The signaling sequence may also be used for requesting a shared uplink channel for transmitting packets. A shared uplink channel is a channel for simultaneously transmitting user data to the base station from a plurality of terminals. For example, 8 terminals registered with the base station can utilize this channel simultaneously.

If a terminal transmits a signaling sequence at a start time defined by the base station, this means the request for a certain capacity (for example, 16 kbit/s) of the channel for transmitting user data. The base station sends an acknowledgement (or rejection) of the reservation of channel capacity over a special control channel which is denoted as an access control channel. With the acknowledgement of the reservation of capacity, the terminal is further informed, via the access control channel, of information necessary for the transmission of the user data. If a CDMA method is used for transmitting the user data, the access control channel is used for conveying to the terminal the start time of the transmission of the user data, the data rate, the transmit power and the spreading factor for the shared uplink user channel. After the terminal has received the information about the start time and the spreading factor, the terminal starts transmitting the user data enveloped in packets.

For example, the base station has determined a certain number of terminals (for example 8) that may use the shared uplink user channel for transmitting user data enveloped in packets. After a respective request from a terminal, the terminal that has so far not been a user of this shared uplink user channel can be determined as a new user of the channel by the base station. For accepting the new terminal, another terminal which has so far formed part of the group utilizing the shared uplink user channel can be removed, or the new terminal can be added to the group when the channel capacity has free resources left. It should be borne in mind that then the interference produced within the system is not surpassed by the addition of the terminal. When a terminal is to be removed, this is done, for example, by the base station when this terminal has no longer requested any channel capacity for the shared uplink channel for a certain period of time (that is: transmission energy for a certain data rate, time slot, spreading factor, carrier frequency).

A terminal that would like to become a user of the shared uplink user channel sends out a signaling sequence at a start time determined by the base station. This start time may be known to the terminals, or the respective terminal may be informed thereof by the base station after the terminal has requested the start time over a channel that may be prone to collisions. After the signaling sequence has been received, the base station tests whether a terminal has to be removed from the group of the terminals collectively using the shared uplink user channel. If this is the case, the two respective terminals are informed via the access control channel of the fact that one terminal has been removed from the group and another one has been accepted. Alternatively, there is only announced via the access control channel that a new terminal has been included in the group.

The advantage of pointing one signaling sequence out for the request of channel capacity in the shared uplink control channel or for the request of being included in the group of the terminals collectively using the shared uplink control channel is that no collision can occur. Furthermore, because of the fact that a shared uplink control channel is used, for example, for transmitting user data in packets instead of various dedicated user channels, an increase of capacity caused by statistical multiplex effects is realized. Since the base station informs the terminals of the transmit power for the transmission of the user data, the interference of the system can be controlled better.

What is claimed is:

1. A wireless network comprising:

at least one base station; and a plurality of assigned terminals for exchanging user data and control data, wherein each of the plurality of assigned terminals are assigned to a respective base station, and each of the terminals is assigned a specific start time in which to transmit a signaling sequence that does not overlap with a transmission of a signaling sequence by any other terminal of the plurality of terminals assigned to a respective base station of said at least one base station, wherein said at least one base station transmits a respective start time for a signaling sequence of at least one terminal of the plurality of terminals (4 to 14), wherein said at least one base station includes a device for correlating a received signaling sequence and for detecting the pulse evolved from a received and correlated signaling sequence, and wherein said at least one base station, after receiving a signaling response, is provided for rejecting or acknowledging the request for channel capacity from a terminal over a channel collectively used by a plurality of terminals (shared channel).

2. A wireless network as claimed in claim 1, characterized in that the base station is provided for transmitting an acknowledgement or rejection of a channel capacity for at least one terminal over an access control channel.

3. A wireless network as claimed in claim 2, characterized in that via the acknowledgement message the base station is provided for sending further information for transmitting the user data over the shared channel.

4. A wireless network as claimed in claim 1, characterized in that after the reception of a further determined signaling sequence from one terminal the base station is provided for checking whether the terminal can be included in the group of terminals collectively using the shared channel, and in that, in the case of a positive test result, the base station is provided for sending a message to the respective terminal about the use of the shared channel collectively used by the plurality of terminals.

* * * * *